United States Patent
Karidi et al.

(10) Patent No.: US 6,185,335 B1
(45) Date of Patent: Feb. 6, 2001

(54) METHOD AND APPARATUS FOR IMAGE CLASSIFICATION AND HALFTONE DETECTION

(75) Inventors: Ron J. Karidi, Menlo Park; Niklas Nordstrom, Alameda, both of CA (US)

(73) Assignee: Electronics for Imaging, Inc., Foster City, CA (US)

(*) Notice: Under 35 U.S.C. 154(b), the term of this patent shall be extended for 0 days.

(21) Appl. No.: 09/111,047

(22) Filed: Jul. 7, 1998

(51) Int. Cl.[7] .................................................. G06K 9/62
(52) U.S. Cl. ......................... 382/224; 382/168; 382/172; 358/456; 358/534
(58) Field of Search ..................................... 382/162, 168, 382/170, 172, 224, 229; 358/455, 456, 462, 534

(56) References Cited

U.S. PATENT DOCUMENTS

| | | | |
|---|---|---|---|
| 4,194,221 | 3/1980 | Stoffel | 358/283 |
| 4,403,257 | 9/1983 | Hsieh | 358/283 |
| 4,554,593 | 11/1985 | Fox et al. | 358/282 |
| 4,577,235 | 3/1986 | Kannapell et al. | 358/280 |
| 4,722,008 | 1/1988 | Ibaraki et al. | 358/283 |
| 4,893,188 | 1/1990 | Murakami et al. | 358/456 |
| 5,016,118 | 5/1991 | Nannichi | 358/462 |
| 5,119,185 | 6/1992 | Ikeda et al. | 358/75 |
| 5,142,593 | 8/1992 | Kasano | 382/36 |
| 5,193,122 | 3/1993 | Kowalski et al. | 382/9 |
| 5,268,771 | 12/1993 | Murakami et al. | 358/448 |
| 5,271,095 | 12/1993 | Yamada | 395/128 |
| 5,291,309 | 3/1994 | Semasa | 358/455 |
| 5,293,430 | 3/1994 | Shiau et al. | 382/42 |
| 5,317,419 | 5/1994 | Koizumi | 358/462 |
| 5,339,172 | 8/1994 | Robinson | 358/462 |
| 5,341,226 | 8/1994 | Shiau | 358/518 |
| 5,361,142 | 11/1994 | Semasa | 358/455 |
| 5,410,619 | 4/1995 | Fujisawa et al. | 382/54 |
| 5,412,737 | 5/1995 | Govrin | 382/168 |
| 5,546,474 | 8/1996 | Zuniga | 382/176 |

FOREIGN PATENT DOCUMENTS

| | | | |
|---|---|---|---|
| 0195925 A3 | 10/1986 | (EP) | H04N/1/40 |
| 0 291000 A2 | 11/1988 | (EP) | H04N/1/387 |
| 0195925 B1 | 6/1992 | (EP) | H04N/1/40 |
| 0187724 B1 | 9/1992 | (EP) | H04N/1/40 |
| 0521 662 A1 | 1/1993 | (EP) | H04N/1/40 |
| 0527488 A2 | 2/1993 | (EP) | H04N/1/40 |
| 0621725 A1 | 4/1994 | (EP) | H04N/1/46 |
| 0596412 A1 | 5/1994 | (EP) | G06F/15/68 |
| 0527488 B1 | 7/1998 | (EP) | H04N/1/40 |
| 0596412 B1 | 3/1999 | (EP) | G06T/9/20 |
| 2127647 | 4/1984 | (GB) | H04N/1/40 |

*Primary Examiner*—Thomas D. Lee
(74) *Attorney, Agent, or Firm*—Michael A. Glenn (57) ABSTRACT

A method and apparatus for image classification includes a first embodiment, in which halftone detection is performed based on the size of a boundary set between a class of light pixels and a class of dark pixels, and further based upon image information contained within each single image plane (i.e within one color plane). This embodiment of the invention is based upon the distinctive property of images that halftone areas within the image have larger boundary sets than non-halftone areas within the image. A second, equally preferred embodiment of the invention provides a cross color difference correlation technique that is used to detect halftone pixels.

32 Claims, 5 Drawing Sheets

METHOD AND APPARATUS FOR IMAGE CLASSIFICATION AND HALFTONE DETECTION

BACKGROUND OF THE INVENTION

1. Technical Field

The invention relates to image processing. More particularly, the invention relates to image classification and halftone detection, especially with regard to digitized documents, acquired for example by digital scanning, and the reproduction of such images on digital color printers.

2. Description of the Prior Art

Electronic documents contain a variety of information types in various formats. A typical page of such document might contain both text (i.e. textual information) and images (i.e. image information). These various types of information are displayed and reproduced in accordance with a particular formatting scheme, where such formatting scheme provides a particular appearance and resolution as is appropriate for such information and printing device. For example, text may be reproduced from a resident font set and images may be reproduced as continuous tone (contone) or halftone representations. In cases where a halftone is used, information about the specific screen and its characteristics (such lines per inch (lpi)) is also important.

It is desirable to process each type of information in the most appropriate manner, both in terms of processing efficiency and in terms of reproduction resolution. It is therefore useful to be able to identify the various information formats within each page of a document. For example, it is desirable to identify halftone portions of a document and, as appropriate, descreen the halftone information to provide a more aesthetically pleasing rendition of, e.g an image represented by such information.

In this regard, various schemes are known for performing halftone detection. See, for example, T. Hironori, False Halftone Picture Processing Device, Japanese Publication No. JP 60076857 (1 May 1985); I. Yoshinori, I. Hiroyuki, K. Mitsuru, H. Masayoshi, H. Toshio, U. Yoshiko, Picture Processor, Japanese Publication No. JP 2295358 (Dec. 6, 1990); M. Hiroshi, Method and Device For Examining Mask, Japanese Publication No. JP 8137092 (May 31, 1996); T. Mitsugi, Image Processor, Japanese Publication No. JP 5153393 (Jun. 18, 1993); J.-N. Shiau, B. Farrell, Improved Automatic Image Segmentation, European Patent Application No. 521662 (Jan. 7, 1993); H. Ibaraki, M. Kobayashi, H. Ochi, Halftone Picture Processing Apparatus, European Patent No. 187724 (Sep. 30, 1992); Y. Sakano, Image Area Discriminating Device, European Patent Application NO. 291000 (Nov. 17, 1988); J.-N. Shiau, Automatic Image Segmentation For Color Documents, European Patent Application No. 621725 (Oct. 26, 1994); D. Robinson, Apparatus and Method For Segmenting An Input Image In One of A Plurality of Modes, U.S. Pat. No. 5,339,172 (Aug. 16, 1994); T. Fujisawa, T. Satoh, Digital Image Processing Apparatus For Processing A Variety of Types of Input Image Data, U.S. Pat. No. 5,410,619 (Apr. 25, 1995); R. Kowalski, D. Bloomberg, High Speed Halftone Detection Technique, U.S. Pat. No. 5,193,122 (Mar. 9, 1993); K. Yamada, Image Processing Apparatus For Estimating Halftone Images From Bilevel and Pseudo Halftone Images, U.S. Pat. No. 5,271,095 (Dec. 14, 1993); S. Fox, F. Yeskel, Universal Thresholder/Discriminator, U.S. Pat. No. 4,554,593 (Nov. 19, 1985); H. Ibaraki, M. Kobayashi, H. Ochi, Halftone Picture Processing Apparatus, U.S. Pat. No. 4,722,008 (Jan. 26, 1988); J. Stoffel, Automatic Multimode Continuous Halftone Line Copy Reproduction, U.S. Pat. No. 4,194,221 (Mar. 18, 1980); T. Semasa, Image Processing Apparatus and Method For Multi-Level Image Signal, U.S. Pat. No. 5,361,142 (Nov. 1, 1994); J.-N. Shiau, Automatic Image Segmentation For Color Documents, U.S. Pat. No. 5,341,226 (Aug. 23, 1994); R. Hsieh, Halftone Detection and Delineation, U.S. Pat. No. 4,403,257 (Sep. 6, 1983); J.-N. Shiau, B. Farrell,Automatic Image Segmentation Using Local Area Maximum and Minimum Image Signals, U.S. Pat. No. 5,293,430 (Mar. 8, 1994); and T. Semasa, Image Processing Apparatus and Method For Multi-Level Image Signal, U. S. U.S. Pat. No. 5,291,309 (Mar. 1, 1994).

While there is a substantial volume of art that addresses various issues associated with halftone generation and detection, there has not heretofore been available a fast and efficient technique for effective image classification and for detection of halftone segments and other components of a document. In particular, such techniques as are known do not effectively detect halftone information and classify image regions, especially with regard to efficient algorithms based upon such factors as boundary sets for image information within a single image plane and cross color differences for image information across multiple images planes.

It would be advantageous to provide an improved technique for image classification and halftone detection.

It would also be advantageous to provide a technique that has the to detect halftone components of a document without having predetermined information about the halftone technique used to produce the original image, and moreover, without having detailed information on the specific characteristics of that halftone technique, such as the type of screen used, the threshold array, or the lpi.

SUMMARY OF THE INVENTION

The invention provides a method and apparatus for image classification and halftone detection.

In a first embodiment of the invention, image classification and halftone detection is performed based on the size of a boundary set, and further based upon image information contained within a single image plane (i.e within one color plane). This embodiment of the invention is based upon the distinctive property of images that halftone areas within the image have a larger boundary set than non-halftone areas within the image.

For example, consider a window of size K×K. In this example, a threshold T1 is adaptively determined and all pixels having a value <T1 are declared to be dark, while all other pixels are declared to be light. This threshold may be set in any of several ways that may include, for example a histogram technique: a histogram of values may be computed in the current window. A right peak area and left peak area are then found in the histogram. If these two areas merge, the threshold is set to the median, otherwise the threshold is set to the end of the larger peak.

As an alternative to the adaptive threshold, another technique, based on a weighted support decision mechanism, can be used to mark the pixels as dark or light.

Given another threshold T2 and a window in the image, the number of vertical class changes and horizontal class changes which occur in the window is counted, where "class change" means a change from a dark pixel to a light pixel or from a light pixel to a dark pixel. The percentage of light pixels in the window is denoted as p, while the percentage of dark pixels is denoted as q. The expected number of vertical and horizontal changes on a K×K window is 4 p q K (K−1).

The type of a current pixel is determined by comparing the actual number of class changes to the probability based estimate. If the ratio of these two numbers is higher than the threshold T2, then the pixel is declared a halftone pixel.

In a second, equally preferred embodiment of the invention, cross color difference correlation is used to detect halftone pixels. This is in contrast to most prior art techniques in which halftone detection and image region classification methods are applied separately to each color component.

In this embodiment, for each pixel having R, G, and B components in an image, there is a surrounding K×K window (K odd). The RGB values of the pixels in this window are denoted R(i), G(i), and B(i), where i=0, . . . , k*k−1; and the RGB averages are denoted aR, aG, and aB. It has been empirically determined that a window size of K=3 or K=5 provides the best results in terms of cost/performance.

The Euclidean norms of the R( ), G( ), B( ) vectors are denoted IRI, IGI, IBI, and the following sums are computed:

xRG=Σ((R(i)−R)(G(i)−G))  xaRG=Σ((R(i)−aR)(G(i)−aG))

xGB=Σ((G(i)−G)(B(i)−B))  xaGB=Σ((G(i)−aG)(B(i)−aB))

xBR=Σ((B(i)−B)(R(i)−R))  xaBR=Σ((B(i)−aB)(R(i)−aR))

The normalized results xRG/(IRI IGI), . . . correspond to a cosine of the angle between components in the window. This angle is relatively small for contone and text image information and higher for standard halftone screens used in color printing, where each color screen is tilted differently with respect to the page orientation.

The decision as to whether or not a pixel belongs to the halftone area is made by comparing the results above to a predetermined threshold, which is typically 0.6–0.7.

This detection technique is not as efficient in detecting line screens or screens that are exactly the same for all components and is not applicable to areas of an image in which a single ink is used.

DETAILED DESCRIPTION OF THE INVENTION

The invention provides a method and apparatus for image classification and halftone detection. The method and apparatus provides two independent techniques that may be combined to provide a robust image classification and halftone detection scheme. These techniques are referred to herein as the boundary technique and the cross correlation technique, respectively, and are discussed in detail below.

Figure 1:
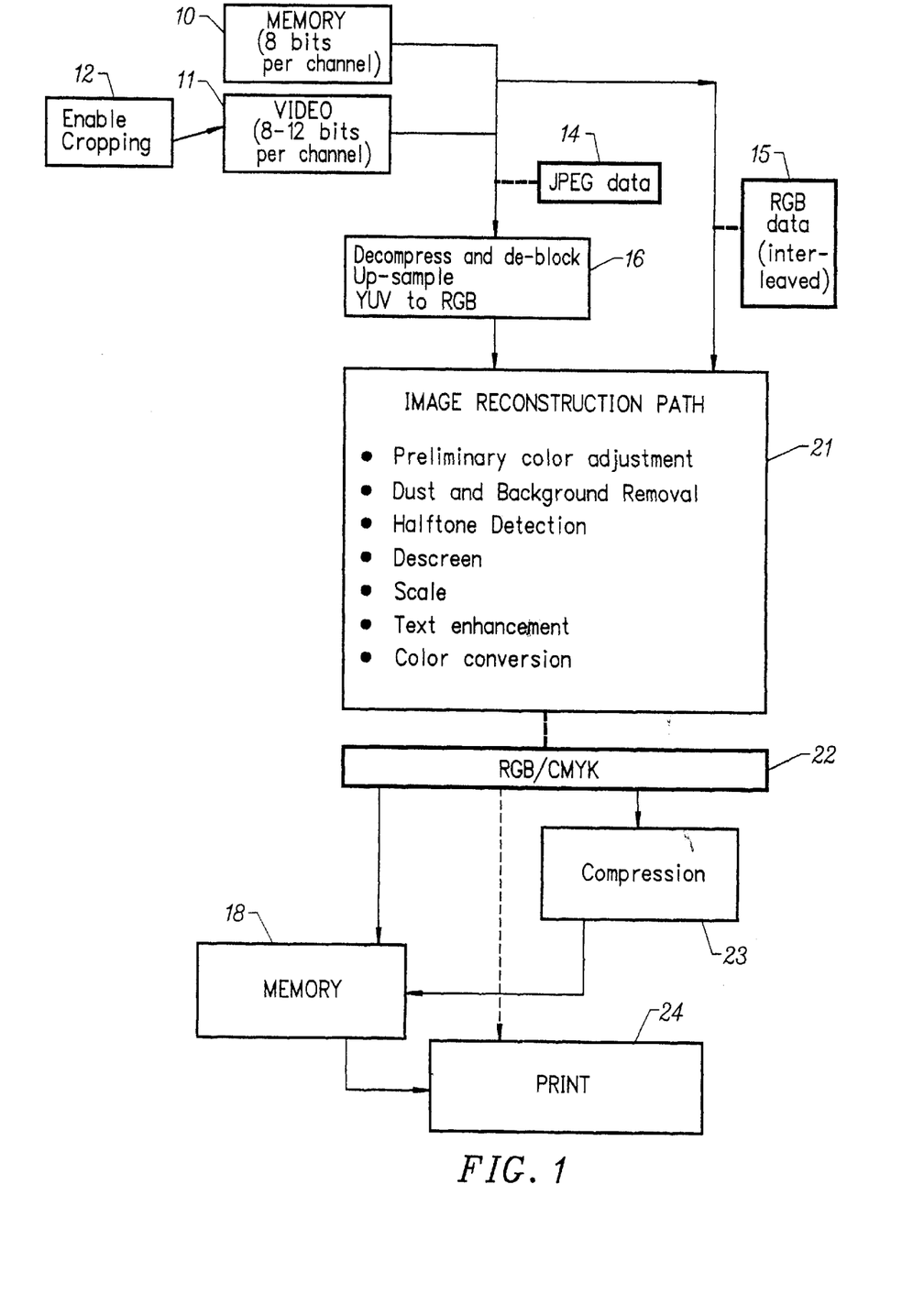
FIG. 1 is a block schematic diagram of an image processing system which includes an image classification and halftone detection module according to the invention.

FIG. 1 is a block schematic diagram of an image processing system which includes an image classification and halftone detection module according to the invention. Image information is provided to the system, either as scanner RGB 15 (e.g. in the case of a digital color copier) or from memory 10. Also, a scanned image may be cropped by a cropping function 12, resulting in a video signal 11. The image information may also include JPEG data 14.

The image information is decompressed and deblocked, up-sampled, and converted to RGB as necessary 16. The image information is then provided to an image reconstruction path 21 (discussed in greater detail below in connection with FIG. 2).

The processed image in RGB or CMYK 22 may be routed to a print engine 24 and memory 19. Compression 23 is typically applied to reconstructed image information that is to be stored in the memory.

Figure 2:
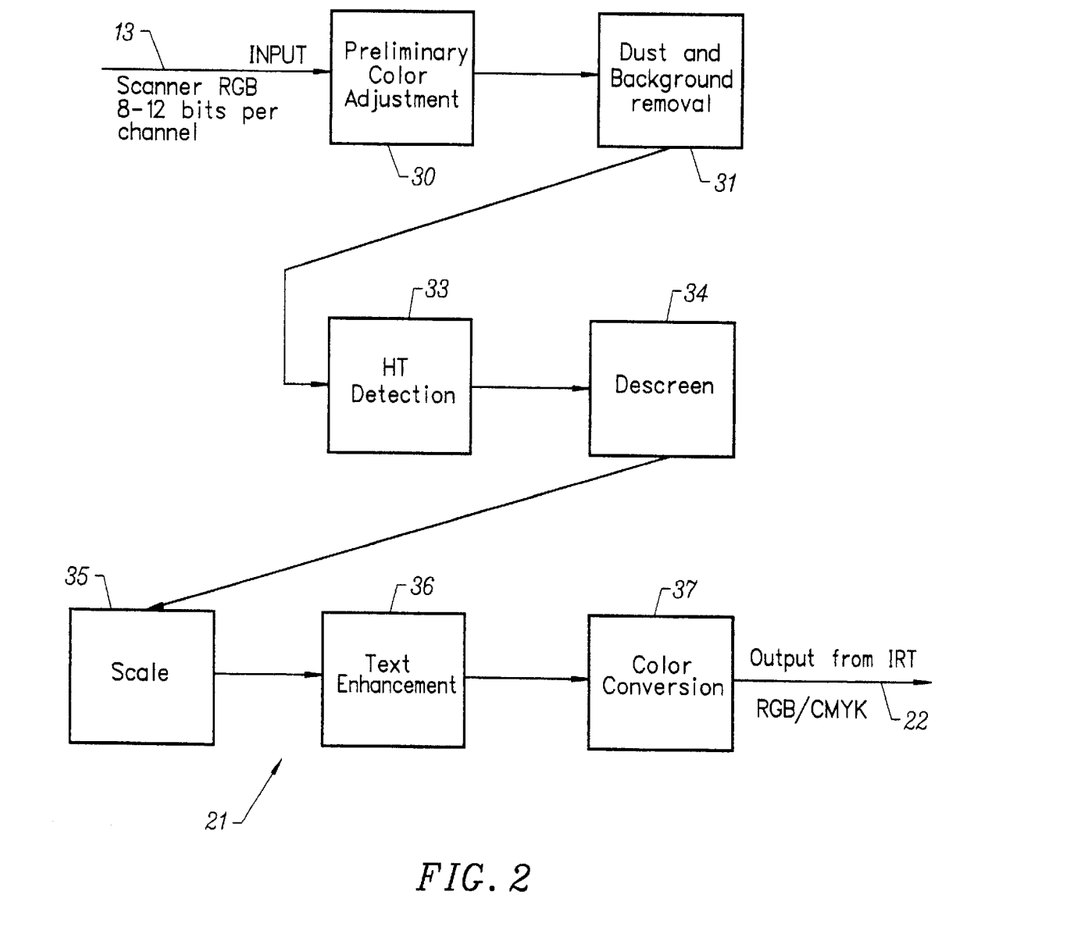
FIG. 2 is a flow diagram of an image reconstruction path which includes an image classification and halftone detection step according to the invention.

FIG. 2 is a flow diagram of an image reconstruction path which includes an image classification and halftone detection step according to the invention. Scanner RGB 13 is typically input to the image reconstruction path 21. The data are first subjected to preliminary color adjustment 30 and dust and background removal 31. Thereafter, halftone detection 33 is performed (as is discussed in greater detail below) and the image is descreened 34. Thereafter, the image is scaled 35, text enhancement is performed 36, and the image data are color converted 37, producing output RGB or CMYK 22 as appropriate for the system print engine.

Boundary Technique

In a first embodiment of the invention, halftone detection is performed based on the size of a boundary set, and further based upon image information contained within a single image plane (i.e within one color plane). This embodiment of the invention is based upon the distinctive property of images that halftone areas within the image have a larger boundary set than non-halftone areas within the image. When short on resources, such as computing time or memory, it is of advantage to apply this technique to the intensity component instead of applying it separately to each of the R,G,B components.

Figure 3:
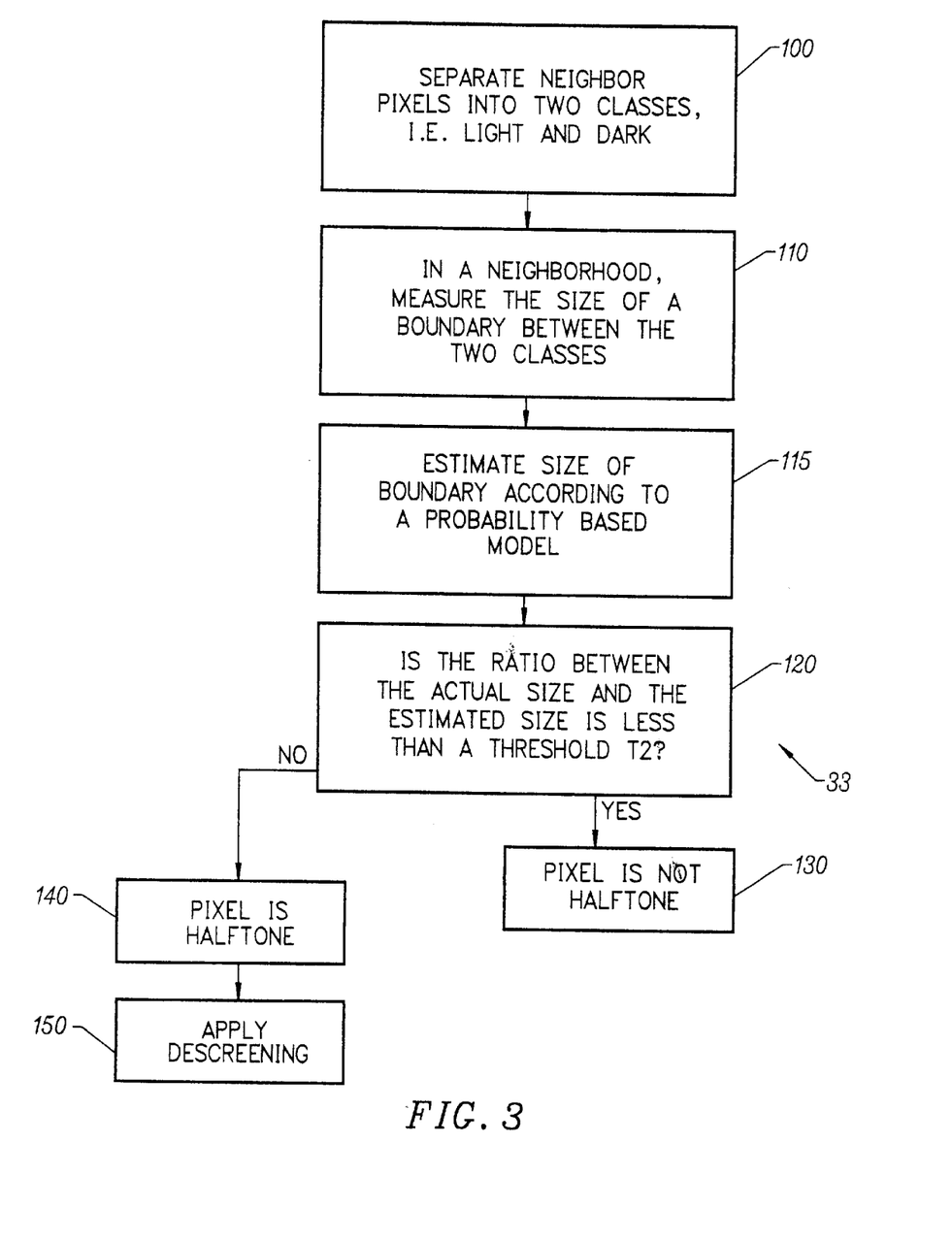
FIG. 3 is a flow diagram illustrating a boundary technique for image classification and halftone detection according to the invention.

FIG. 3 is a flow diagram illustrating the boundary technique. The boundary technique may be expressed as follows:

In the neighborhood of every pixel, separate the neighbor pixels into two classes, i.e. dark and light (100).

In a neighborhood (which may be different than the neighborhood described above that is used to separate the pixels into classes), measure the size of the boundary between the two classes (110). The size of the boundary is estimated according to a probability based model (115). If the ratio between the actual (measured) size and the estimated size is less than a threshold T2 which is adaptively computed (120), then the pixel is not a halftone pixel (130); if the ratio between the actual (measured) size and the estimated size is equal to or greater than the threshold T2 (120), then the pixel is a halftone pixel (140) and descreening techniques may be applied thereto (150).

For example, consider a window of size K×K. In this example, a threshold T1 is adaptively determined and all pixels having a value <T1 are declared to be dark, while all other pixels are declared to be light. This threshold may be set in any of several ways including, for example, a histogram technique: a histogram of values may be computed in the current window. A right peak area and left peak area are then found in the histogram. If these two areas merge, the threshold is set to the median, otherwise the threshold is set to the end of the larger peak.

As an alternative to the adaptive threshold, another technique, based on a weighted support decision mechanism, can be used to mark the pixels as dark or light.

Histogram Technique

A histogram of values may be computed in the current window, the histogram is analyzed, and a threshold is determined by which the class of a pixel under consideration is set as follows:

If the pixel value is less than the threshold, the pixel is dark; and

If the pixel value is greater than or equal to the threshold, then the pixel is light.

In this technique, a right peak area and left peak area are found in the histogram. If these two areas intersect, the threshold is set to the median, otherwise the threshold is set to the end of the larger peak.

Table 1 below is a pseudo code listing showing histogram analysis for the boundary echnique.

TABLE 1

Histogram Analysis for the Boundary Technique

```
/*
 * Histogram analysis for the "Boundary Method:
 * Go from both sides until BRK consecutive bins have count <=1
 * Then compare the group sizes of the dark-class and the light-class,
 * and cut closer to the bigger group.
 *
 * The purpose of this piece of code is to compute the
 * "class_threshold":
 *
 * This number will determine the threshold from light to dark
 * in the current window. Pixels with higher intensity than the
 * threshold are considered light. The others are dark.
 *
 * We also compute "class_size" which is the size of the larger class.
 * If this size is too big, it is hard to separate the pixels into two
 * classes.
 *
 * We do the following:
 *
 * If the difference between the lightest pixel to the darkest pixel in
 * the window is large enough, we set the threshold to be the median.
 * If not, we decide that this is NOT a HT pixel.
 *
 */
#define BRK 3
#define Histogram_size 32
const int Q_factor=256/Histogram_sizes;
/*
 * light class
 */
light_size=0;
brk_cnt=0;
light_threshold=0;
win_max=-1;
for (icnt=Histogram_size-1; icnt>=0; 8cnt--) {
    cnt=Histogram [cnt]
    light_size+=cnt;
    if (light_size *2<size) median=Q_factor *icnt;
    if ( (win_max==-1_&&;lightt_size>=BRK)
    win_max=Qfactor * (icnt+1) -1;
    /* increment or restart */
    brk_cnt=(light_size>=BRK) * (cnt<=1) * (brk_cnt+1);
    if (brk_cnt == BRK) {
      light_threshold=Q_factor *icnt;
      break;
      }
}
/*
 * dark class
 */
dark_size=0;
brk_cnt=0;
dark_threshold=256
win_min=-1;
for (icnt=0; icnt<Histogram_size; icnt++) {
    cnt=histogram {icnt];
    dark_size+=cnt;
    if (dark_size *2<size) median=Q_factor * (icnt+1);
```

TABLE 1-continued

Histogram Analysis for the Boundary Technique

```
    if ( (win_min==-1) && dark_size>=BRK)
    win_min=Q_factor *icnt;
    /* increment or restart */
    brk_cnt=(dark_size>=BRK) * (cnt<=1) * (brk_cnt+1);
    if (brk_cnt == BRK) {
    dark_threshold=Q_factor * (icnt+1);
    break;
    }
}
/*
 * set threshold
 */
win_dif=win_max-win_min;
if (light_size >= dark_size) {
class_threshold=light_threshold;
class_size=light_size;
}
else {
class_threshold=dark_threshold
class_size=dark_size;
}
if (class_size >= size-BRK) {
    /*    uni-modal population
     *    if support is wide enough, cut at the median,
     *    otherwise - do not cut
     */
    if (win_dif >= BRK *Q_factor) {
    class_threshold=median;
    }
    else {
        decision+NOT_HT;/* virtually constant block */
        return ( );
    }
}
```

Weighted Support Technique.

The following definitions are used in connection with discussion herein of the weighted support technique:

W=win-width, which is the width of the window to one side. For example, if the window is a 5×5 window, then there are two pixels to each side of the central (examined) pixel and the window width is W=2.

WL=win-length, which is the length of the window and which is equal to (2*W)+1.

WS=win-size, which is the window size and which is equal to WL*WL.

N_compares=2*WL*(WL−1)

VB=Vertical boundary, which is the number of pixels that are of a different class than the pixel directly above them.

HB=Horizontal boundary, which is the number of pixels that are of a different class than the pixel directly to the left of them.

BT=Boundary threshold, which is a parameter set by the application.

LC=Light class, which is the number of light pixels.

DC=Dark class, which is the number of dark pixels.

Algorithm.

Let:

center=intensity of the center pixel;

cnt_d=number of pixels within the window that are darker than the center pixel;

cnt_l=number of pixels within the window that are lighter than the center pixel;

avg_d=average of intensities that are darker than the center pixel;

avg_l=average of intensities that are lighter than the center pixel:

avg=average of intensities in the window; and dev=standard deviation of intensities in the window.

Then:

$$threshold=(avg\_d+avg\_l)/2;$$

and

D1=(center-avg_d)/(avg_l-center)≦½
D2=center<threshold−8
D3=cnt_d/cnt_l≦⅓
D4=cnt_d/cnt_l≦½
D5=center<50
D6=cnt_d<cnt_l
L1=(avg_l-center)/(center-avg_d)≧½
L2=center>threshold+8
L3=cnt_l/cnt_d≦⅓
L4=cnt_l/cnt_d≦½
L5=center>200
L6=cnt_l<cnt_d
Then:

$$D\_support=5*D1+4*D2+3*D3+2(D4+D5)+D6;$$

and $$L\_support=5*L1+4*L2+3*L3+2(L4+L5)+L6.$$

If (D_support<L_support), then the center pixel is light;
If (D_support=L_support), and (cnt_L<cnt_D), then the center pixel is light;
Otherwise, the center pixel is dark.

In the event that one of the classes is too small (LC<W or DC<W) (FIG. 3: 300), the pixel is not halftone (310). Accordingly, the area examined is not descreened to avoid loss of shadow details.

Comparison With The Estimation Model

After all of the pixels have been marked with light/dark attributes using either the histogram technique or the weighted support technique, a final decision is made on the type of pixel (halftone or not halftone) based on the size of the boundary set between light pixels and dark pixels.

To measure the size of the boundary set in a window measuring WL×WL, perform 2*WL*(WL−1) XOR's (Exclusive OR's), where WL(WL−1) XOR's are applied for the vertical boundary and WL(WL−1) XOR's are for the horizontal boundary.

Denote N_compares=2*WL*(WL−1). A probabilistic model is then introduced for a two class population distribution. Assuming for the sake of simplicity a binomial model, then the expected number of class changes is equal to N_compares*(pq+qp),
where:

p=probability (dark pixel), and q=1−p=probability (light pixel).

Approximate p by DC/WS, q by LC/WS, then the expected size of the boundary, which is denoted by Boundary_expected, is N_compares*2pq.

In accordance with the discussion above, it follows that:

$$Boundary\_expected=(2*N\_compares)(LC/WS)(DC/WS)$$

An external parameter BT allows a degree of freedom when fitting to the binomial model.

BT is a number between 0 and 1 where a value closer to 1 corresponds to a good binomial approximation.

If the Boundary size=VB+HB<Boundary_expected*BT, mark the pixel as not halftone;
Else, mark the pixel as halftone.

EXAMPLE—BOUNDARY TECHNIQUE

Class map:
x=dark, o=light.

| | | | | |
|---|---|---|---|---|
| O | X | O | O | X |
| O | X | O | O | X |
| X | X | X | X | X |
| O | O | O | X | O |
| O | O | O | O | O |

W=2;
WL=5;
WS=25,
DC=10,
LC=15,
N_Compares=40
VB=8,
HB=8,
BT=0.95.
Boundary_expected=2*40*15/25*10/25=19.2
The value 19.2*0.95=18.24 is not less than 16. Therefore, the pixel is not a halftone pixel.

Cross-Correlation.

In a second, equally preferred embodiment of the invention, cross color difference correlation is used to detect halftone pixels. This is in contrast to most prior art techniques in which halftone detection and image region classification methods are applied separately to each color component.

In this embodiment, for each pixel having R, G, and B components in an image, there is a surrounding K×K window (K odd). The RGB values of the pixels in this window are denoted R(i), G(i), and B(i), where i=0, . . . , k*k−1; and the RGB averages are denoted aR, aG, and aB. It has been empirically determined that of window size of K=3 or K=5 provides the best results in terms of cost/performance.

The Euclidean norms of the R( ), G( ), B( ) vectors are denoted IRI, IGI, IBI, and the following sums are computed:

xRG=Σ((R(i)−R)(G(i)−G))  xaRG=Σ((R(i)−aR)(G(i)−aG))

xGB=Σ((G(i)−G)(B(i)−B))  xaGB=Σ((G(i)−aG)(B(i)−aB))

xBR=Σ((B(i)−B)(R(i)−R))  xaBR=Σ((B(i)−aB)(R(i)−aR))

The normalized results xRG/(IRI IGI), . . . correspond to the cosine of the angle between components in the window. This angle is relatively small for contone and text image information and higher for standard halftone screens used in color printing, where each color screen is tilted differently with respect to the page orientation.

The decision as to whether or not a pixel belongs to the halftone area is made by comparing the results above to a predetermined threshold, which is typically 0.6–0.7. This detection technique is not as efficient in detecting line screens or screens that are exactly the same for all components and is not applicable to areas of an image in which a single ink is used.

This embodiment of the invention computes the correlation between the R plane, the G plane, and the B plane inside a square neighborhood of a current pixel. A low correlation factor indicates a halftone (HT) area having halftone screens that are not the same for all colors. This method is usually used in conjunction with the boundary set method (discussed above) and is a complementary halftone detection method.

The computation is controlled by the following parameters:

W=Window size=The size of a neighborhood window.
MN=Minimal norm=Threshold for minimal norm within a single component window.
T=Correlation threshold=threshold for classifying a single pixel.
A=W×W=area of a window.

Figure 4:
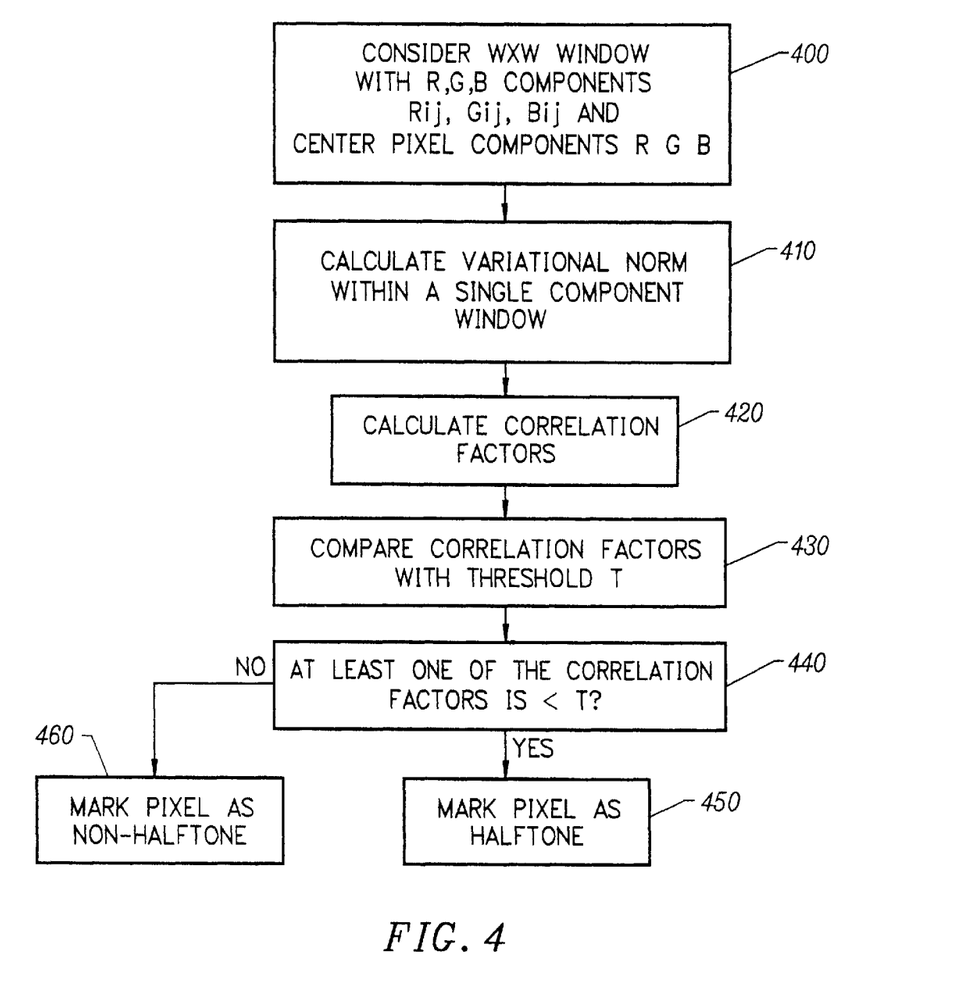
FIG. 4 is a flow diagram illustrating a cross correlation technique for image classification and halftone detection according to the invention.

FIG. 4 is a flow diagram illustrating a cross correlation technique for image classification and halftone detection according to the invention. Consider a window of size W×W, with R,G,B components Rij, Gij, Bij and center pixel components R,G,B (400). The following discussion describes how this embodiment of the invention determines whether or not the current pixel should be marked as a halftone candidate.

Computations:

Calculate the variational norm within each single component window (410): N(R), N(G), N(B). Denote $\underline{R}_{ij}=R_{ij}-R$, $\underline{G}_{ij}=G_{ij}-G$, $\underline{B}_{ij}=B_{ij}-B$, $$N(R)=(\Sigma \underline{R}_{ij}^2)^{1/2}$$

Calculate correlation factors (420).
ΣCor(R,G)=2 if N(R)≦MN or N(G)≦MN
ΣCor(R,G)=|Σ$\underline{R}_{ij}$ $\underline{G}_{ij}$|/(N(R) N(G)) otherwise
Similarly, define N (G), N(B), Cor(G,B), Cor(B,R).

Compare correlation factors with a threshold T (430). A pixel is marked as a halftone candidate (450) if at least one of the correlation factors Cor(R,G), Cor (G,B), Cor (B,R) is less than T (440). If not, i.e. if all of them are greater or equal to T, the current pixel is marked as non-halftone (460).

EXAMPLES—CORRELATION TECHNIQUE

Example 1
Let W=3, MN=20.00, T=0.35
Neighborhood:

| (R) | | |
|---|---|---|
| 110 | 42 | 58 |
| 201 | 80 | 43 |
| 7 | 255 | 255 |
| (G) | | |
| 81 | 140 | 60 |
| 90 | 191 | 220 |
| 37 | 204 | 64 |
| (B) | | |
| 200 | 189 | 204 |
| 196 | 200 | 205 |
| 187 | 197 | 198 |

N(R)=292.26, N(G)=287.95, N(B)=18.97.
Cor(R,G)=0.243, Cor(G,B)=2, Cor(B,R)=2.
Because 0.243<T=0.35, the center pixel (80,191,200) is marked as HT candidate.

Example 2

| (R) | | |
|---|---|---|
| 147 | 145 | 237 |
| 147 | 243 | 131 |
| 231 | 134 | 146 |

| -continued | | |
|---|---|---|
| (G) | | |
| 72 | 81 | 29 |
| 75 | 15 | 72 |
| 24 | 85 | 80 |
| (B) | | |
| 251 | 255 | 253 |
| 250 | 250 | 254 |
| 255 | 255 | 255 |

N(R)=249.1, N(G)=154.45, N(B)=11.22.
Cor(R,G)=0.99, Cor (G,B)=2, Cor (B,R)=2.
Because all correlation factors are greater than 0.35, the pixel is marked non-halftone.

Combined Boundary Detection/Cross Correlation Technique.

Figure 5:
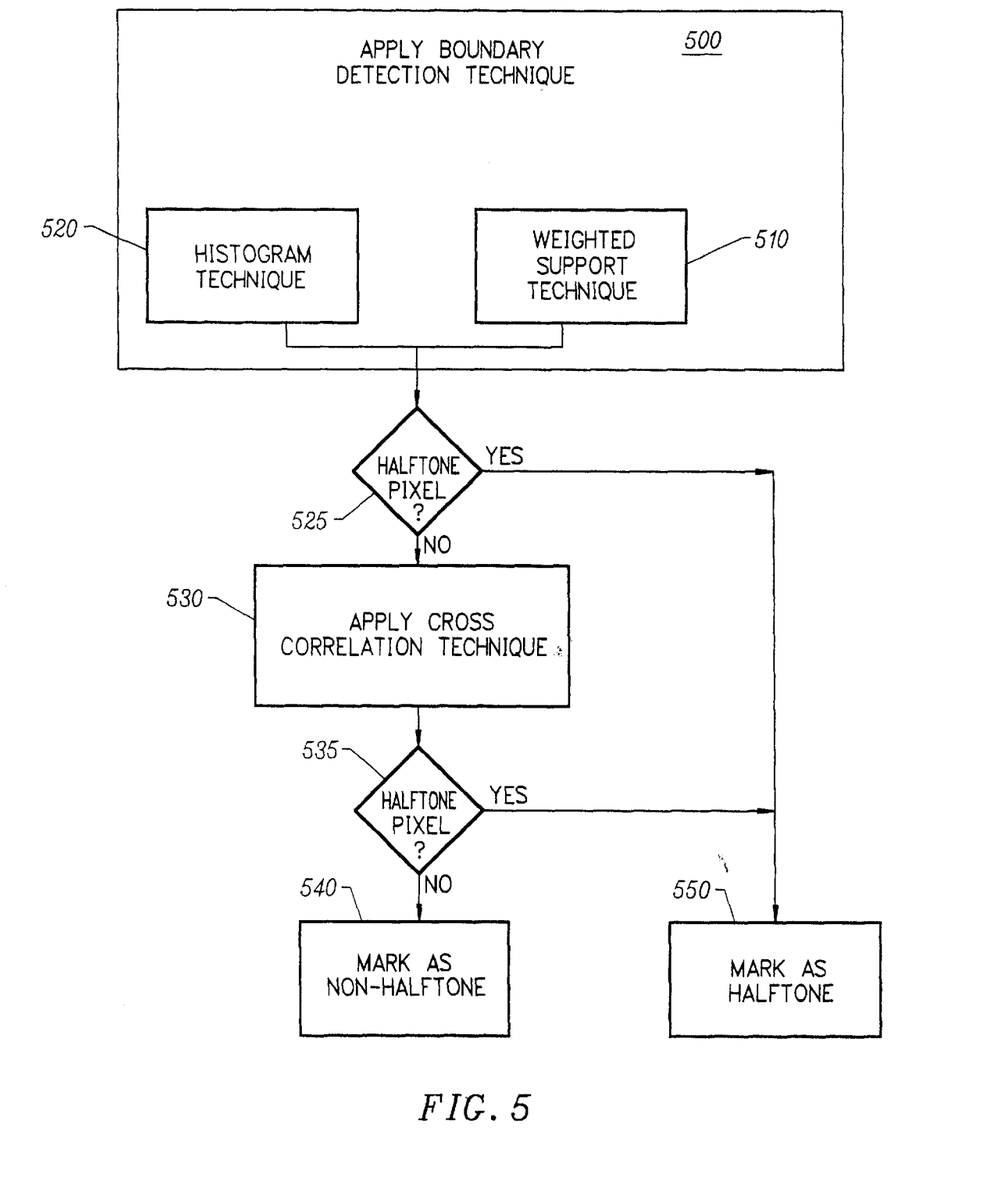
FIG. 5 is a flow diagram illustrating a combined boundary detection/cross correlation technique for image classification and halftone detection according to the invention.

As discussed above, the boundary detection technique and cross correlation technique may be combined. FIG. 5 is a flow diagram illustrating a combined boundary detection/cross correlation technique for image classification and halftone detection according to the invention. The boundary detection technique is preferably applied first (500), using either the histogram technique (520) or the weighted support technique (510). If the pixel is not detected to be a halftone pixel by the boundary detection technique (525), the cross correlation technique is then applied (530). If at least one technique detects the pixel as being a halftone pixel, then the pixel is marked as a halftone pixel (550). If neither boudnary detetion technique, nor the cross relation technique detect the pixel as a halftone pixel (525,535), then the pixel is marked as a non-halftone pixel (540). This combined technique is extremely accurate but is computationally expensive. However, this technique does provide two levels of determination with regard to pixel type and thus improves the image quality by reliably applying descreening techniques to halftone pixels.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for image classification and halftone detection, comprising:

selecting a subject pixel;

separating neighbor pixels about the subject pixel into light and dark classes in a first neighborhood;

measuring a size of a boundary set between the light and dark classes in a second neighborhood;

determining if the boundary size is less than a first threshold, wherein the subject pixel is not a halftone pixel; and determining if the boundary size is equal to or greater than the first threshold, wherein the subject pixel is a halftone pixel, and wherein descreening techniques may optionally be applied to the subject pixel.

2. The method of claim 1, wherein said first threshold is adaptively determined.

3. The method of claim 2, further comprising the steps of:

counting the number of vertical class changes and horizontal class changes which occur in said second neighborhood;

denoting the percentage of light pixels in said second neighborhood as p;

denoting the percentage of dark pixels as q;

determining the type of said subject pixel by comparing the actual number of class changes counted to a probability based estimate to determine a ratio therebetween; and declaring said subject pixel a halftone pixel if said ratio is higher than a second threshold;

wherein said subject pixel is otherwise not a halftone pixel.

4. The method of claim 1, wherein the light/dark separation is performed using any of a histogram technique and a weighted support technique.

5. The method of claim 4, wherein a second threshold is set using said histogram technique, the method further comprising:

computing a histogram of values in the first neighborhood;

analyzing the histogram; and determining the threshold.

6. The method of claim 5, further comprising the steps of:

finding a right peak area and left peak area in said histogram;

setting said first threshold to a median if said right peak area and said left peak area intersect, otherwise setting said first threshold to the end of the larger of said right peak area and said left peak area.

7. The method of claim 4, wherein a second threshold is set using the weighted support technique, the method further comprising:

setting:
threshold=(avg_d+avg_l)/2;
wherein:
center=intensity of the subject pixel;
cnt_d=number of pixels within the second neighborhood that are darker than the subject pixel;
cnt_l=number of pixels within the second neighborhood that are lighter than the subject pixel;
avg_d=average of intensities that are darker than the subject pixel;
avg_l=average of intensities that are lighter than the subject pixel;
avg=average of intensities in the second neighborhood; and
dev=standard deviation of intensities in the second neighborhood.

8. The method of claim 7, further comprising the steps of:

setting:
D1=(center-avg_d)/(avg_l-center)≦½
D2=center<threshold−8
D3=cnt_d/cnt_l≦⅓
D4=cnt_d/cnt_l≦½
D5=center<50
D6=cnt_d<cnt_l
and
L1=(avg_l-center)/(avg-avg_d)≧½
L2=center>threshold+8
L3=cnt_l/cnt_d≦⅓
L4=cnt_l/cnt_d≦½
L5=cint>200
L6=cnt_l<cnt_d
wherein:

D_support=5*D1+4*D2+3*D3+2(D4+D5)+D6;
and
L_support=5*L1+4*L2+3*L3+2(L4+L5)+L6 and;

wherein said center pixel is light if (D_support<L_support); said center pixel is light if (D_support=L_support); and (cnt_L<cnt_D) and otherwise said center pixel is dark.

9. The method of claim 8, wherein a model is introduced for a two class population distribution, comprising the steps of:

performing 2*WL(WL−1) exclusive OR, in a window measuring WL×WL, where WL(WL−1) exclusive ORs are applied for a vertical boundary and WL(WL−1) exclusive ORs are applied for a horizontal boundary;

denoting N_compares=2*W(WL−1), where there is an expected number of class changes that is equal to N_compares*(pq+qp), where:
p=probability (dark pixel),
and
q=1−p=probability (light pixel); and approximating p by DC/WS, q by LC/WS, then the expected size of a boundary which is denoted by Boundary_expected, is N_compares*2pq.

wherein:
W=the width of said second neighborhood to one side;
WL=the length of said second neighborhood, wherein WL is equal to (2*W)+1;
WS=the size of the second neighborhood, which is equal to WL*WL;
N_compares=2*WL*(WL−1);
VB=the number of pixels that are of a different class than a pixel directly above them;
HB=the number of pixels that are of a different class than a pixel directly to the left of them;
BT=Boundary threshold;
LC=the number of light pixels; and
DC=the number of dark pixels.

10. The method of claim 9, wherein:

Boundary_expected=(2*N_compares) (LC/WS) (DC/WS).

11. The mehtod of claim 10, further comprising the step of:

marking said subject pixel as not halftone if Boundary size=VB+HB<Boundary_expected*BT; otherwise marking said subject pixel as half; wherein an external parameter BT allows a degree of freedom when fitting to a binamial model.

12. The method of claim 10, wherein said subject pixel is not halftone if LC<W or DC<W.

13. The method of claim 1, further comprising the step of:

applying a cross correlation technique to detect halftone pixels.

14. The method of claim 13, comprising the step of:

computing a correlation between an R plane, a G plane, and a B plane inside a square neighborhood of said subject pixel;

wherein a low correlation factor indicates a halftone area having halftone screens that are not the same for all colors.

15. The method of claim 14, further comprising the steps of:

calculating a variational norm within a single component window, wherein $\underline{R}_{ij}=R_{ij}-R$, $\underline{G}_{ij}=G_{ij}\_G$, $\underline{B}_{ij}=B_{ij}\_B$:

$N(R)=(\Sigma \underline{R}_{ij}^2)^{1/2}$ calculating correlation factors:

$$\text{Cor}\left(R, G\right) = \begin{cases} 2 & \text{if } N(R) \leq MN \text{ or } N(G) \leq MN \\ |\Sigma \underline{R}_{ij}\underline{G}_{ij}|/(N(R)N(G)) & \text{otherwise} \end{cases}$$

similarly defining N(G), N(B), Cor(G,B), Cor(B,R);

comparing correlation factors with a threshold T;

marking said subject pixel as a halftone candidate if at least one of said correlation factors Cor(R,G), Cor(G, B), Cor (B,R) is less than a threshold; and marking said subject pixel as not halftone if all of said correlation factors are greater or equal to said threshold.

16. A method for image classification and halftone detection, comprising the steps of:

selecting a subject pixel;

separating neighbor pixels about said subject pixel into light and dark classes in a first neighborhood;

measuring the size of a boundary between said light and dark classes in a second neighborhood;

determining if said boundary size is less than a first threshold, wherein said subject pixel is not a halftone pixel;

determining if said boundary size is equal to or greater than said first threshold, wherein said subject pixel is a halftone pixel, and wherein descreening techniques may optionally be applied to said subject pixel; and applying a cross correlation technique to detect halftone pixels.

17. An apparatus for image classification and halftone detection, comprising:

a first neighborhood consisting of:
  a subject pixel; and
  neighbor pixels about said subject pixel;
    wherein said neighbor pixels about said subject pixel are separated into light and dark classes in said first neighborhood;

a second neighborhood, wherein the size of a boundary set between said light and dark classes in said second neighborhood is measured;

means for determining if said boundary size is less than a first threshold, wherein said subject pixel is not a halftone pixel;

means for determining if said boundary size is equal to or greater than said first threshold, wherein said subject pixel is a halftone pixel; and means for optionally applying descreening techniques to said subject pixel.

18. The apparatus of claim 17, wherein said first threshold is adaptively determined.

19. The apparatus of claim 18, further comprising:

means for counting the number of vertical class changes and horizontal class changes which occur in said second neighborhood;

means for denoting the percentage of light pixels in said second neighborhood as p;

means for denoting the percentage of dark pixels as q;

means for determining said first threshold by comparing the actual number of class changes counted to a probability based estimate to determine a ratio therebetween; and means for declaring said subject pixel a halftone pixel if said ratio is higher than said a second threshold;

wherein said subject pixel is otherwise not a halftone pixel.

20. The apparatus of claim 17, wherein said light/dark separation is performed using any of a histogram technique and a weighted support technique.

21. The apparatus of claim 20, wherein said light/dark separation is performed using said histogram technique, said apparatus further comprising:

means for computing a histogram of values in said first neighborhood;

means for analyzing said histogram;

means for declaring a pixel as darkdarker than a second threshold and declaring said pixel as light if it is lighter than said second threshold; and means for determining said second threshold.

22. The apparatus of claim 21, further comprising:

means for finding a right peak area and left peak area in said histogram; and means for setting said first threshold to a median if said right peak area and said left peak area intersect, otherwise setting said first threshold to the end of the larger of said right peak area and said left peak area.

23. The apparatus of claim 17, wherein said dark/light separation is performed using said weighted support technique, said apparatus further comprising:

means for setting:
  threshold=(avg_d+avg_l)/2;
wherein:
  center=intensity of said subject pixel;
  cnt_d=number of pixels within said second neighborhood that are darker than said subject pixel;
  cnt_l=number of pixels within said second neighborhood that are lighter than said subject pixel;
  avg_d=average of intensities that are darker than said subject pixel;
  avg_l=average of intensities that are lighter than said subject pixel;
  avg=average of intensities in said second neighborhood; and
  dev=standard deviation of intensities in said second neighborhood.

24. The apparatus of claim 23, further comprising:

means for setting:
  D1=(center-avg_d)/(avg_l-center)≦½
  D2=center<threshold−8
  D3=cnt_d/cnt_l≦⅓
  D4=cnt_d/cnt_l≦½
  D5=center<50
  D6=cnt_d<cnt_l
and
  L1=(avg_l-center)/(avg-avg_d)≧½
  L2=center>threshold+8
  L3=cnt_l/cnt_d≦⅓
  L4=cnt_l/cnt_d≦½
  L5=cint>200
  L6=cnt_l<cnt_d
wherein:
  D_support=5*D1+4*D2+3*D3+2(D4+D5)+D6;
and
  L_support=5*L1+4*L2+3*L3+2(L4+L5)+L6 and;

wherein said center pixel is light if (D_support<L_support); said center pixel is light if (D_support=L_support); and (cnt_L<cnt_D) and otherwise said center pixel is dark.

25. The apparatus of claim 24, wherein a model is introduced for a two class population distribution, comprising:

means for performing 2*WL(WL−1) exclusive ORs in a window measuring WL×WL, where WL(WL−1) exclusive ORs are applied for a vertical boundary and WL(WL−1) exclusive ORs are applied for a horizontal boundary;

means for denoting N_compares=2*W*(WL−1) where there is an expected number of class changes that is equal to N_compares*(pq+qp), where:
p=probability (dark pixel),
and
q=1−p=probability (light pixel); and means for approximating pN DC/WS, qN LC/WS, such that the expected size of a boundary which is denoted by Boundary_expected, is N_compares*2pq;

wherein:
W=the width of said second neighborhood to one side;
WL=the length of said second neighborhood, wherein WL is equal to (2*W)+1;
WS=the size of the second neighborhood, which is equal to WL*WL;
N_compares=2*WL*(WL−1);
VB=the number of pixels that are of a different class than a pixel directly above them;
HB=the number of pixels that are of a different class than a pixel directly to the left of them;
BT=Boundary threshold;
LC=the number of light pixels; and
DC=the number of dark pixels.

26. The apparatus of claim 25, wherein:
Boundary_expected=(2 *N_compares) (LC/WS) (DC/WS).

27. The apparatus of claim 26, further comprising:
means for marking said subject pixel as not halftone if Boundary size=VB+HB<Boundary_expected*BT; otherwise marking said subject pixel as half; wherein an external parameter BT allows a degree of freedom when fitting to be a binomial model.

28. The apparatus of claim 26, wherein said subject pixel is not halftone if LC<W or DC<W.

29. The apparatus of claim 17, further comprising:
means for applying a cross correlation technique to detect halftone pixels.

30. The apparatus of claim 29, further comprising:
means for computing a correlation between an R plane, a G plane, and a B plane inside a square neighborhood of said subject pixel;

wherein a low correlation factor indicates a halftone area having halftone screens that are not the same for all colors.

31. The apparatus of claim 30, further comprising:
means for calculating a variational norm within a single component window, wherein $\underline{R}_{ij}=R_{ij}-R$, $\underline{G}_{ij}=G_{ij}-G$, $\underline{B}_{ij}=B_{ij}-B$:

$$N(R)=(\Sigma \underline{R}_{ij}^2)^{1/2}$$

means for calculating correlation factors:

$$\mathrm{Cor}(R, G) = \begin{cases} 2 & \text{if } N(R) \leq MN \text{ or } N(G) \leq MN \\ |\Sigma \underline{R}_{ij} \underline{G}_{ij}|/(N(R)N(G)) & \text{otherwise} \end{cases}$$

means for similarly defining N(G), N(B), Cor(G,B), Cor(B,R);

means for comparing correlation factors with a threshold T;

means for marking the subject pixel as a halftone candidate if at least one of the correlation factors Cor(R,G), Cor(G,B), Cor(B,R) is less than a threshold; and means for marking the subject pixel as not halftone if all of the correlation factors are greater or equal to the threshold.

32. An apparatus for image classification and halftone detection, comprising:

means for selecting a subject pixel;

means for separating neighbor pixels about said subject pixel into light and dark classes in a first neighborhood;

means for measuring the size of a boundary between said light and dark classes in a second neighborhood;

means for determining if said boundary size is less than a first threshold, wherein said subject pixel is not a halftone pixel;

means for determining if said boundary size is equal to or greater than said first threshold, wherein said subject pixel is a halftone pixel, and wherein descreening techniques may optionally be applied to said subject pixel; and means for applying a cross correlation technique to detect halftone pixels if said boundary size is not equal to or greater than said first threshold;

means for calculating a variational norm within a single component window;

means for calculating correlation factors for said subtext pixel; and means for comparing said correlation factors with a second threshold, wherein said subject pixel is a halftone pixel if at least one of said correlation factors is less than said second threshold.

* * * * *